(12) United States Patent
Svensson et al.

(10) Patent No.: US 12,012,984 B2
(45) Date of Patent: Jun. 18, 2024

(54) SET OF PANELS WITH A MECHANICAL LOCKING DEVICE

(71) Applicant: Välinge Innovation AB, Viken (SE)

(72) Inventors: Johan Svensson, Kattarp (SE); Peter Derelöv, Viken (SE)

(73) Assignee: Välinge Innovation AB, Viken (SE)

( * ) Notice: Subject to any disclaimer, the term of this patent is extended or adjusted under 35 U.S.C. 154(b) by 366 days.

(21) Appl. No.: 17/185,428

(22) Filed: Feb. 25, 2021

(65) Prior Publication Data

US 2021/0262508 A1    Aug. 26, 2021

(30) Foreign Application Priority Data

Feb. 26, 2020    (EP) ..................................... 20159475

(51) Int. Cl.
*F16B 12/24* (2006.01)
*F16B 12/20* (2006.01)
(Continued)

(52) U.S. Cl.
CPC .............. *F16B 12/46* (2013.01); *F16B 12/20* (2013.01); *F16B 12/24* (2013.01); *F16B 2012/103* (2013.01)

(58) Field of Classification Search
CPC .......... F16B 12/12; F16B 12/20; F16B 12/24; F16B 12/46; F16B 2012/103; Y10T 403/72
See application file for complete search history.

(56) References Cited

U.S. PATENT DOCUMENTS 8,887,468 B2  11/2014  Håkansson et al.
9,375,085 B2   6/2016  Derelöv
(Continued)

FOREIGN PATENT DOCUMENTS

DE    11 07 910 B    5/1961
DE    93 02 568    *  6/1993    .............. F16B 12/46
(Continued)

OTHER PUBLICATIONS

Derelöv, Peter, et al., U.S. Appl. No. 17/588,733 entitled "Arrangements for Preparing of Furniture Product," filed in the U.S. Patent and Trademark Office on Jan. 31, 2022.
(Continued)

*Primary Examiner* — Michael P Ferguson
(74) *Attorney, Agent, or Firm* — Boone IP Law (57) ABSTRACT

A set including a first panel, a second panel and a mechanical locking device for locking the first panel to the second panel, wherein the first panel includes a first main plane, and a first edge surface, the second panel includes a second edge surface, the first edge surface is facing the second edge surface at a junction plane in a locked position of the first and the second panel, the mechanical locking device includes at least one rod-shaped element at the first edge surface, at least one insertion groove at the second edge surface, the rod-shaped element is configured to be inserted into the insertion groove, the mechanical locking device further including at least one locking groove at the first or second edge surface and at least one locking part, the locking part is configured to be inserted into the locking groove and lock against the locking surface.

15 Claims, 8 Drawing Sheets

(51) Int. Cl.
*F16B 12/46* (2006.01)
*F16B 12/10* (2006.01)

(56) References Cited

U.S. PATENT DOCUMENTS

| | | | |
|---|---|---|---|
| 9,538,842 B2 | 1/2017 | Håkansson et al. |
| 9,655,442 B2 | 5/2017 | Boo et al. |
| 9,714,672 B2 | 7/2017 | Derelöv et al. |
| 9,723,923 B2 | 8/2017 | Derelöv |
| 9,726,210 B2 | 8/2017 | Derelöv et al. |
| 9,945,121 B2 | 4/2018 | Derelöv |
| 10,034,541 B2 | 7/2018 | Boo et al. |
| 10,202,996 B2 | 2/2019 | Håkansson et al. |
| 10,415,613 B2 | 9/2019 | Boo |
| 10,448,739 B2 | 10/2019 | Derelöv et al. |
| 10,451,097 B2 | 10/2019 | Brännström et al. |
| 10,486,245 B2 | 11/2019 | Fridlund |
| 10,506,875 B2 | 12/2019 | Boo et al. |
| 10,544,818 B2 | 1/2020 | Fridlund |
| 10,548,397 B2 | 2/2020 | Derelöv et al. |
| 10,669,716 B2 | 6/2020 | Derelöv |
| 10,670,064 B2 | 6/2020 | Derelöv |
| 10,724,564 B2 | 7/2020 | Derelöv |
| 10,731,688 B2 | 8/2020 | Brännström et al. |
| 10,736,416 B2 | 8/2020 | Derelöv et al. |
| 10,830,266 B2 | 11/2020 | Fridlund |
| 10,830,268 B2 | 11/2020 | Boo |
| 10,871,179 B2 | 12/2020 | Håkansson et al. |
| 10,876,562 B2 | 12/2020 | Pervan |
| 10,876,563 B2 | 12/2020 | Derelöv et al. |
| 10,968,936 B2 | 4/2021 | Boo et al. |
| 11,076,691 B2 | 8/2021 | Boo |
| 11,083,287 B2 | 8/2021 | Boo et al. |
| 11,098,484 B2 | 8/2021 | Derelöv |
| 11,137,007 B2 | 10/2021 | Fridlund |
| 11,204,051 B2 | 12/2021 | Brännström et al. |
| 11,246,415 B2 | 2/2022 | Derelöv et al. |
| 11,272,783 B2 | 3/2022 | Derelöv |
| 2012/0279161 A1 | 11/2012 | Håkansson et al. |
| 2015/0035422 A1 | 2/2015 | Håkansson et al. |
| 2015/0078807 A1 | 3/2015 | Brännström et al. |
| 2015/0078819 A1 | 3/2015 | Derelöv et al. |
| 2015/0196118 A1 | 7/2015 | Derelöv |
| 2015/0198191 A1 | 7/2015 | Boo |
| 2016/0007751 A1 | 1/2016 | Derelöv |
| 2016/0174704 A1 | 6/2016 | Boo et al. |
| 2016/0270531 A1 | 9/2016 | Derelöv |
| 2017/0079433 A1 | 3/2017 | Derelöv et al. |
| 2017/0089379 A1 | 3/2017 | Pervan |
| 2017/0097033 A1 | 4/2017 | Håkansson et al. |
| 2017/0159291 A1 | 6/2017 | Derelöv |
| 2017/0208938 A1 | 7/2017 | Derelöv et al. |
| 2017/0227031 A1 | 8/2017 | Boo |
| 2017/0227032 A1 | 8/2017 | Fridlund |
| 2017/0227035 A1 | 8/2017 | Fridlund |
| 2017/0234346 A1 | 8/2017 | Fridlund |
| 2017/0298973 A1 | 10/2017 | Derelöv |
| 2017/0360193 A1 | 12/2017 | Boo et al. |
| 2018/0080488 A1 | 3/2018 | Derelöv |
| 2018/0087552 A1 | 3/2018 | Derelöv et al. |
| 2018/0112695 A1 | 4/2018 | Boo et al. |
| 2018/0119717 A1 | 5/2018 | Derelöv |
| 2018/0202160 A1 | 7/2018 | Derelöv |
| 2018/0328396 A1 | 11/2018 | Fransson et al. |
| 2019/0113061 A1 | 4/2019 | Håkansson et al. |
| 2019/0166989 A1 | 6/2019 | Boo et al. |
| 2019/0191870 A1 | 6/2019 | Derelöv |
| 2019/0195256 A1 | 6/2019 | Derelöv |
| 2019/0289999 A1 | 9/2019 | Derelöv et al. |
| 2019/0320793 A1 | 10/2019 | Boo |
| 2019/0323532 A1 | 10/2019 | Boo |
| 2019/0323533 A1 | 10/2019 | Boo |
| 2019/0323534 A1 | 10/2019 | Derelöv |
| 2019/0323535 A1 | 10/2019 | Derelöv |
| 2020/0003242 A1 | 1/2020 | Brännström et al. |
| 2020/0055126 A1 | 2/2020 | Fridlund |
| 2020/0069048 A1 | 3/2020 | Derelöv et al. |
| 2020/0069049 A1 | 3/2020 | Derelöv et al. |
| 2020/0102978 A1 | 4/2020 | Fridlund |
| 2020/0121076 A1 | 4/2020 | Derelöv et al. |
| 2020/0214447 A1 | 7/2020 | Derelöv et al. |
| 2020/0300284 A1 | 9/2020 | Pervan |
| 2020/0337455 A1 | 10/2020 | Boo et al. |
| 2020/0340513 A1 | 10/2020 | Derelöv |
| 2021/0079650 A1 | 3/2021 | Derelöv |
| 2021/0148392 A1 | 5/2021 | Brännström et al. |
| 2021/0180630 A1 | 6/2021 | Bruno et al. |
| 2021/0190112 A1 | 6/2021 | Derelöv |
| 2021/0207635 A1 | 7/2021 | Håkansson et al. |
| 2021/0222716 A1 | 7/2021 | Derelöv et al. |
| 2021/0262507 A1 | 8/2021 | Svensson et al. |
| 2021/0276108 A1 | 9/2021 | Derelöv et al. |
| 2021/0285480 A1 | 9/2021 | Derelöv et al. |
| 2021/0381251 A1 | 12/2021 | Svensson |
| 2022/0018373 A1 | 1/2022 | Boo |
| 2022/0049735 A1 | 2/2022 | Meijer |

FOREIGN PATENT DOCUMENTS

| | | | |
|---|---|---|---|
| DE | 10 2015 103 429 A1 | 10/2015 | |
| GB | 245 332 | 1/1926 | |
| IT | 20 162 212 A1 | 10/2017 | |
| JP | 108343659 * | 7/2018 | .............. F16B 12/24 |
| WO | WO 2009/136195 A1 | 11/2009 | |
| WO | 2020046193 A1 | 3/2020 | |
| WO | WO 2020/046194 A1 | 3/2020 | |

OTHER PUBLICATIONS

Svensson, Johan, et al., U.S. Appl. No. 17/674,262 entitled "Mechanical Connection Arrangement for Panels," filed in the U.S. Patent and Trademark Office on Feb. 17, 2022.
U.S. Appl. No. 16/386,732, Christian Boo, filed Apr. 17, 2019, (Cited herein as US Patent Application Publication No. 2019/0323532 A1 of Oct. 24, 2019).
U.S. Appl. No. 16/386,810, Christian Boo, filed Apr. 17, 2019, (Cited nerein as US Patent Application Publication No. 2019/0323533 A1 of Oct. 24, 2019).
U.S. Appl. No. 16/553,325, Peter Derelöv and Johan Svensson, filed Aug. 28, 2019, (Cited herein as US Patent Application Publication No. 2020/0069048 A1 of Mar. 5, 2020).
U.S. Appl. No. 16/553,350, Peter Derelöv and Johan Svensson, filed Aug. 28, 2019 (Cited herein as US Patent Application Publication No. 2020/0069049 A1 of Mar. 5, 2020).
U.S. Appl. No. 16/856,765, Peter Derelöv, filed Apr. 23, 2020, (Cited herein as US Patent Application Publication No. 2020/0340513 A1 of Oct. 29, 2020).
U.S. Appl. No. 17/154,344, filed Jan. 21, 2021, Peter Derelöv and Johan Svensson, (Cited herein as US Patent Application Publication No. 2021/0222716 A1 of Jul. 22, 2021).
U.S. Appl. No. 17/173,823, filed Feb. 11, 2021, Peter Derelöv and Johan Svensson, (Cited herein as US Patent Application Publication No. 2021/0276108 A1 of Sep. 9, 2021).
U.S. Appl. No. 17/185,403, Johan Svensson and Peter Derelöv, filed Feb. 25, 2021, (Cited herein as US Patent Application Publication No. 2021/0262507 A1 of Aug. 26, 2021).
U.S. Appl. No. 17/370,521, Christian Boo, filed Jul. 8, 2021.
International Search Report/Written Opinion dated Apr. 1, 2021 in PCT/EP2021/054739, ISA/European Patent Office, Rijswijk, NL, 11 pages.
Extended European Search Report issued in EP Application No. 20159475.1, dated Apr. 29, 2020, European Patent Office, Munich, DE, 8 pages.
Boo, Christian, U.S. Appl. No. 17/370,521 entitled "Mechanical Locking System for Panels," filed in the U.S. Patent and Trademark Office on Jul. 8, 2021.

* cited by examiner

SET OF PANELS WITH A MECHANICAL LOCKING DEVICE

CROSS REFERENCE TO RELATED APPLICATIONS

The present application claims the benefit of European Application No. 20159475.1, filed on Feb. 26, 2020. The entire contents of European Application No. 20159475.1 are hereby incorporated herein by reference in their entirety.

TECHNICAL FIELD

Embodiments of the present invention relates to panels that may be arranged perpendicular to each other and locked together with a mechanical locking device. The panels may be assembled and locked together to obtain a furniture product, such as a bookshelf, a cupboard, a wardrobe, a box, a drawer or a furniture component. The locking device may comprise one or more inclined pins.

BACKGROUND

A furniture product provided with a mechanical locking device is disclosed in PCT/SE2019/050801. The furniture comprises a first panel connected mainly perpendicular to a second panel by mechanical locking device. The mechanical locking device may comprise one or more inclined pins and a locking part.

SUMMARY

It is an object of certain aspects of the present invention to provide an improvement over the above described techniques and known art; particularly to facilitate assembling of panels configured to be assembled without the need of using any tools. A further object of at least certain aspects of the present invention is to improve the strength of a mechanical locking device at a miter joint of a set of panels. The panels may be a part of a furniture product, such as a bookshelf, a cupboard, a wardrobe, a kitchen fixture, a drawer, or a box for storing or transportation.

At least some of these and other objects and advantages that will be apparent from the description have been achieved by a set comprising a first panel with a first main plane and a first panel surface, and a second panel with a second main plane and a second panel surface, and a mechanical locking device for locking of a first edge surface of the first panel to a second edge surface of the second panel at a junction plane, wherein the first main plain is essentially perpendicular to the second main plane and the junction plane is extending at a first angle to the first main plane, the mechanical locking device comprises at least one rod-shaped element at the first edge surface and at least one insertion groove at the second edge surface, the rod-shaped element is configured to be inserted into the insertion groove, the rod-shaped element extends at a second angle from the first edge surface, the insertion groove extends into the second edge surface at a third angle from the second edge surface, the mechanical locking device further comprises at least one locking groove at the first edge surface or at the second edge surface and at least one locking part at the other of said first or second edge surface, wherein the locking groove comprises at least one locking surface extending at a fourth angle from the first edge surface or from the second edge surface, the locking part is configured to be inserted into the locking groove and lock against the locking surface, and the second angle is different than the fourth angle, the first angle between the junction plane and the first main plane is about 45°.

The first angle between the junction plane and the first main plane may be about 45°. A different angle may be preferred for a set with different thicknesses of the first and the second panel.

The angle may be adapted such that the junction plane extends through an intersection of an outer face of the first panel and an outer face of the second panel to an intersection of an inner face of the first panel and an inner face of the second panel.

The inner face of the first panel may be facing the inner face of the second panel. An outer face of the first panel may be opposite to the inner face of the first panel. An outer face of the second panel may be opposite to the inner face of the second panel.

An outer corner at the junction plane of the first and the second panel may comprise a beveled edge, preferably covered by a decorative layer. The bevel may increase the strength of the corner. The decorative layer may be a plastic foil, veneer or paint.

According to an aspect the mechanical locking device is configured to obtain the locked position by displacing the first panel relative the second panel in an assembly direction, which is essentially parallel with the first panel surface and essentially parallel to a length direction and/or axial direction of the rod-shaped element.

According to an aspect the fourth angle is about 45° to about 90° larger than the second angle.

According to an aspect the second angle is within the range of about 30° to 60°, or within the range of 40° to 50°, or about 45°.

According to an aspect the mechanical locking device comprises at least two rod-shaped elements.

According to an aspect the mechanical locking device comprises two or more rod-shaped elements, arranged in a row mainly parallel to the first or second edge surface.

According to an aspect the rod-shaped element is arranged in a rod element groove in the first edge surface.

According to an aspect the insertion groove and/or the rod element groove is a drill hole.

According to an aspect the drill hole is a bottom-ended drill hole.

According to an aspect the locking part is flexible.

According to an aspect the locking part in an unflexed/non-compressed state, is configured to be positioned partly in the locking groove.

According to an aspect the locking part comprises a spring.

According to an aspect the locking part is arranged in a locking part groove, on the first edge surface or on the second edge surface.

According to an aspect the first or second edge surface comprises a tongue, wherein said tongue comprises a first tongue surface and a second tongue surface and the other of said opposite first or second edge surface comprises a tongue groove.

According to an aspect the mechanical locking device comprises a first space between the tongue groove and the first tongue surface and/or the second tongue surface in locked position.

According to an aspect the tongue groove comprises one or more rod-shaped elements.

According to an aspect the first panel comprises a first panel groove on the first panel surface and the second panel comprises a second panel groove on the second panel surface.

According to an aspect the set further comprises a back panel configured to be inserted in, and optionally to cooperate with, the first and second panel groove.

According to an aspect the first panel, the second panel and the back panel are wood based panels.

According to an aspect first panel, the second panel and the back panel are furniture panels.

According to an aspect the insertion groove and/or the rod element groove is reinforced by plastic, e.g., thermoplastic, and/or liquid, e.g., PVAc-glue.

BRIEF DESCRIPTION OF THE DRAWINGS

These and other aspects, features and advantages of which embodiments of the invention are capable of, will be apparent and elucidated from the following description of embodiments of the present invention, reference being made to the accompanying drawings, in which FIG. 1A show a 3D-view of an embodiment comprising a set in an un-locked position.

DETAILED DESCRIPTION

Specific embodiments of the invention will now be described with reference to the accompanying drawings.

This invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the embodiments illustrated in the accompanying drawings is not intended to be limiting of the invention. In the drawings, like numbers refer to like elements.

In the drawings and specification, there have been disclosed exemplary aspects of the disclosure. However, many variations and modifications may be made to these aspects without substantially departing from the principles of the present disclosure. Thus, the disclosure should be regarded as illustrative rather than restrictive, and not as being limited to the particular aspects discussed above. Accordingly, although specific terms are employed, they are used in a generic and descriptive sense only and not for purposes of limitation, for example, definition of dimensions such as width or breadth or height or length or diameter depends on how exemplary aspects are depicted, hence, if depicted differently, a shown width or diameter in one depiction is a length or thickness in another depiction.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example aspects may be implemented at least in part by means of both hardware and software, and that several "means", "units" or "devices" may be represented by the same item of hardware.

The different aspects, alternatives and embodiments of the invention disclosed herein may be combined with one or more of the other aspects, alternatives and embodiments described herein. Two or more aspects may be combined.

An embodiment of the invention is shown in FIG. 1A-2B during assembling of a set. The set comprising a first panel 1 with a first main plane 10 and a first panel surface 13, and a second panel 2 with a second main plane 20 and a second panel surface 23, and a mechanical locking device for locking of a first edge surface 11 of the first panel 1 to a second edge surface 21 of the second panel 2 at a junction plane J. The first main plain 10 may be essentially perpendicular to the second main plane 20 and the junction plane J may extend at a first angle α to the first main plane 10. The mechanical locking device comprises at least one rod-shaped element 31 at the first edge surface 11 and at least one insertion groove 32 at the second edge surface 21. The rod-shaped element 31 may be configured to be inserted into the insertion groove 32. The rod-shaped element 31 extends at a second angle β from the first edge surface 11. The insertion groove 32 extends into the second edge surface 21 at a third angle γ from the second edge surface 21. The mechanical locking device further comprises at least one locking groove 35 at the first edge surface 11 or at the second edge surface 21 and at least one locking part 34 at the other of said first or second edge surface, wherein the locking groove 35 comprises at least one locking surface 37 extending at a fourth angle δ from the first edge surface 11 or from the second edge surface 21. The locking part 34 may be configured to be inserted into the locking groove 35 and lock against the locking surface 37, and the second angle β may be different than the fourth angle δ, for example, different by at least 10°. The first angle α between the junction plane J and the first main plane 10 may be within a range of about 30° to 60°, or within the range of 40° to 50°, or about 45°.

The set may be configured to obtain the locked position by displacing the first panel 1 relative the second panel 2 in an assembly direction AD, which may be essentially parallel with the first panel surface 13 and essentially parallel to a length direction L and/or axial direction CA of the rod-shaped element 31.

According an embodiment of the invention the fourth angle δ may be about 45° to about 90° larger than the second angle β.

A locking of the first panel 1 to the second panel 2 in a direction which is parallel with the second panel surface 23 may be obtained by the locking part 34 being inserted into the locking groove 35 and locking against the locking surface 37.

In embodiments wherein the locking groove 35 is a drill hole, the locking surface 37 may be a part of the cylindrical surface of the drill hole.

According an embodiment of the invention the second angle β may be within the range of about 30° to 60°, or within the range of 40° to 50°, or about 45°.

According an embodiment of the invention the third angle γ may be within the range of about 30° to 60°, or within the range of 40° to 50°, or about 45°.

According an embodiment of the invention the second angle β and the third angle γ may be essentially the same.

The second angle β may be measured in a plane parallel to the first panel surface 13.

The third angle γ may be measured in a plane which is perpendicular to the second panel surface 23 and parallel to second edge surface 21.

When the locking groove 35 is at the second edge surface 21, the fourth angle δ may be measured in the same plane as the third angle γ described above. When the locking groove 35 is at the first edge surface 11, the fourth angle δ may be measured in the same plane as the second angle described above.

Figure 1A:
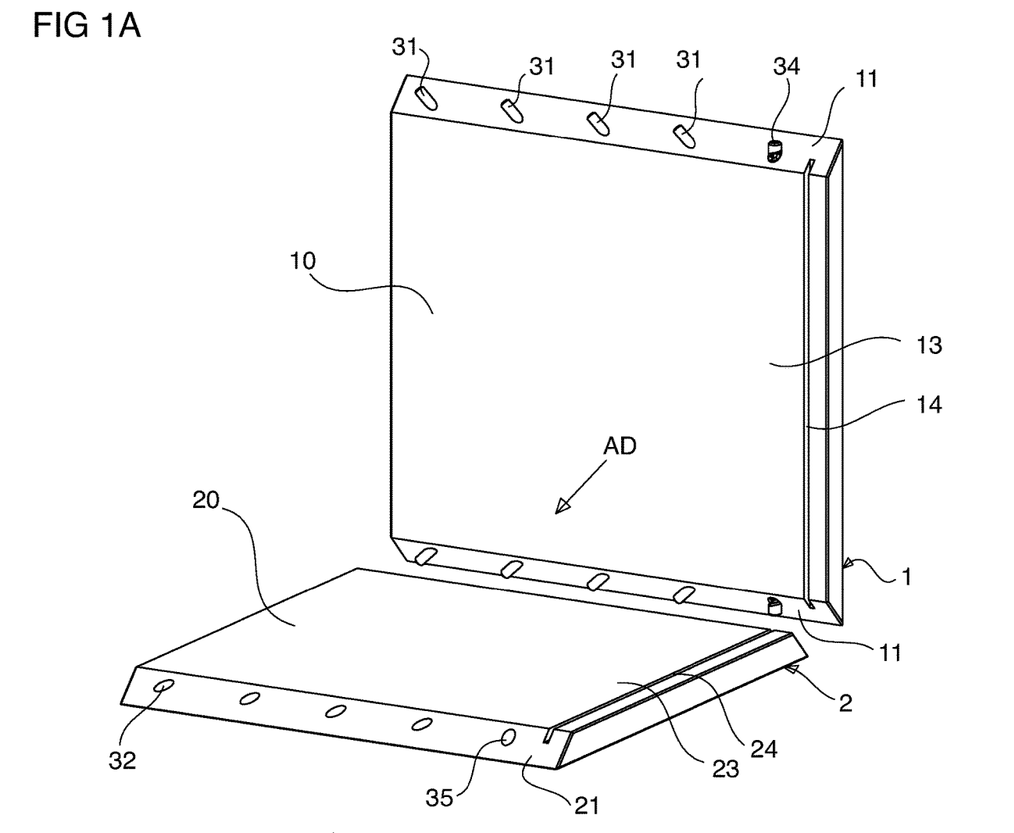
Figure 1B:
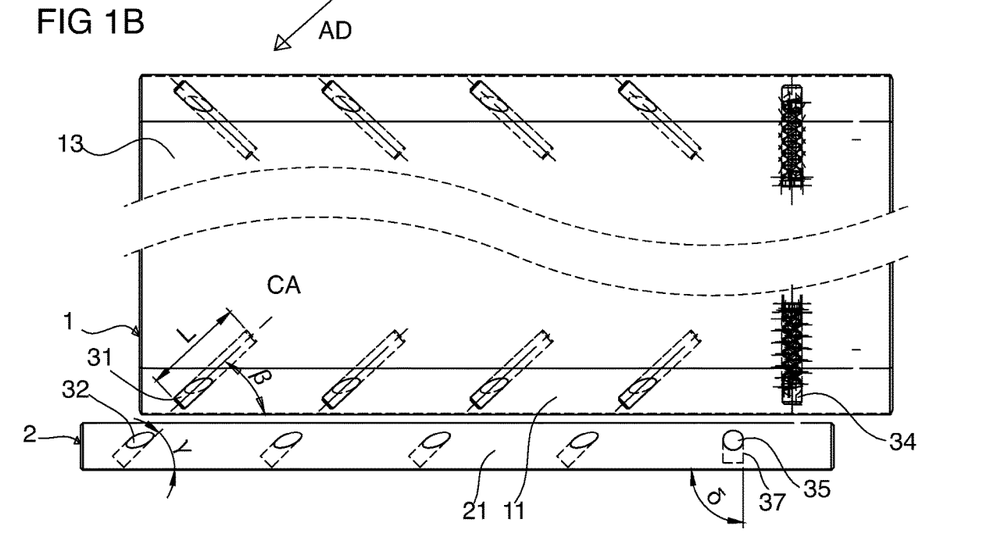
FIG. 1B show a side view of an embodiment comprising a set in an un-locked position. The set may be included in a furniture product comprising no back panel.
Figure 2A:
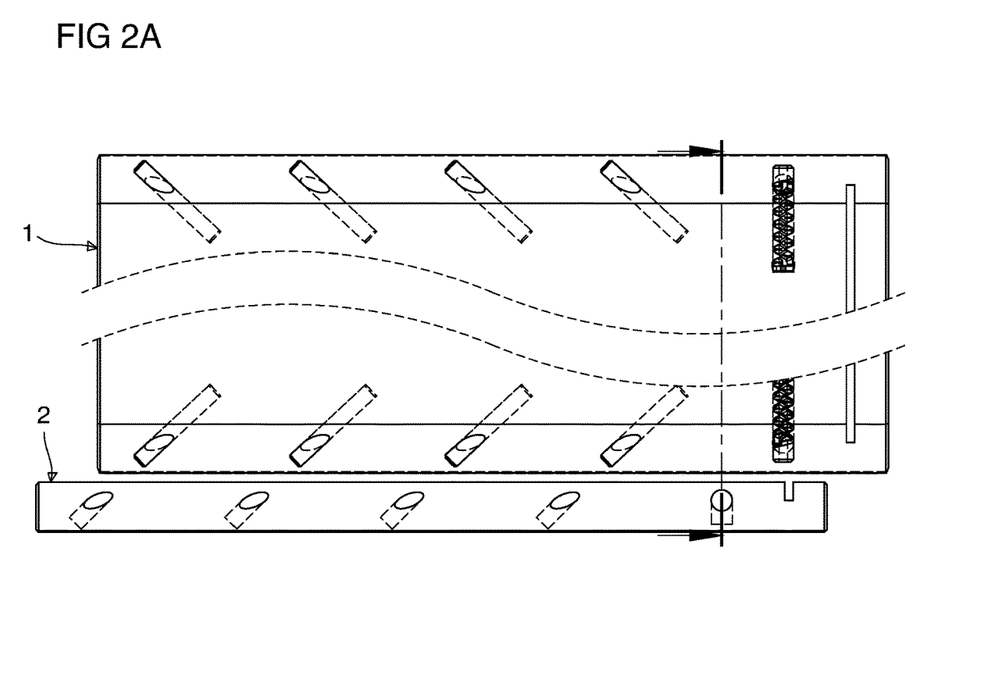
FIG. 2A show a side view of an embodiment comprising a set in an un-locked position.
Figure 2B:
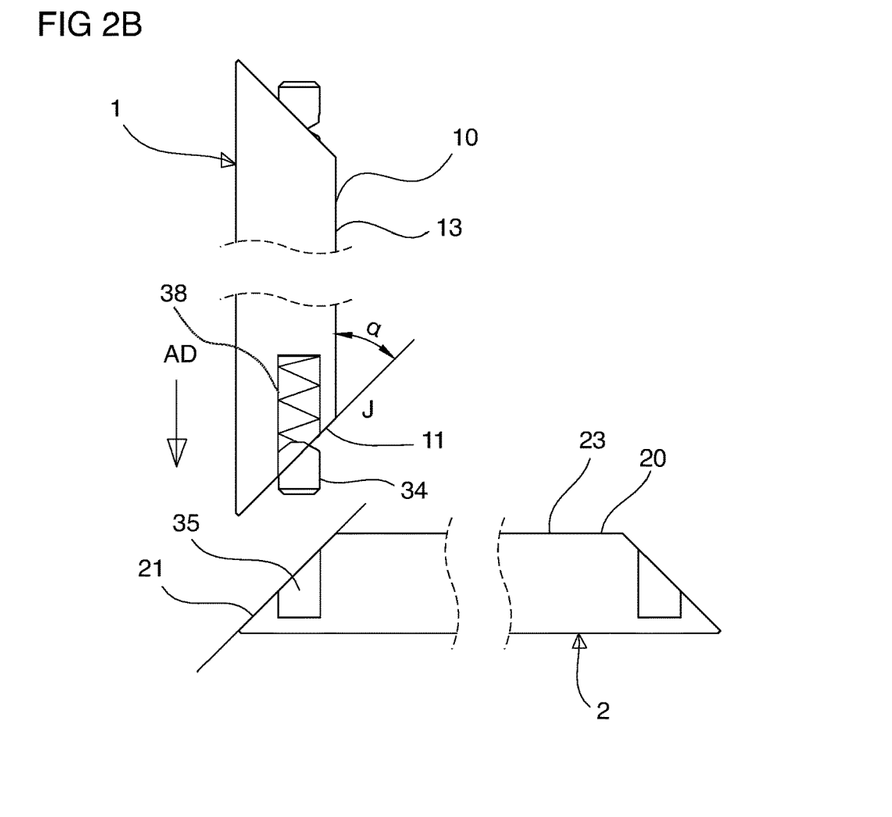
FIG. 2B show a cross sectional view of a set in an un-locked position according to an embodiment of the invention. The cross section intersects the locking groove, as illustrated in FIG. 2A.

The first panel 1 may comprise a first panel groove 14 on the first panel surface 13 and the second panel 2 may comprise a second panel groove 24 on the second panel surface 23 as disclosed in FIGS. 1A, 2A and 2B. The first panel groove 14 and the second panel groove 24 may align when the first panel 1 and the second panel 2 are assembled together. The first panel groove and the second panel groove may be configured so that a back panel 3 can be inserted in, and optionally cooperate with, the first and second panel grooves 14,24.

The first panel groove 14 and/or the second panel groove 24 may be bottom-ended.

The set may be configured to form a furniture without a back panel. A set without the first and second panel groove 14,24 is disclosed in FIG. 1B.

FIG. 2B disclose a set during assembly, when the first and second panels 1,2 are assembled together the locking part 34 may be compressed and may be substantially positioned in the locking part groove 38. The locking part 34 may comprise a spring that facilitates the compression of the locking part 34.

When the first panel 1 is displaced in relation to the second panel 2 in the assembly direction AD, the rod-shaped element 31 becomes inserted into the insertion groove 32. When the locking part 34 meets the locking groove 35 the locking part 34 may expand out in axial direction from the locking part groove 38 and protrude into the locking groove 35. The first panel 1 and second panel 2 will then be locked together, since the positioning of a part of the locking part 34 in the locking groove 35 hinders the first panel 1 from being displaced in relation to the second panel 2 in a direction opposite to the assembly direction.

Figure 3A:
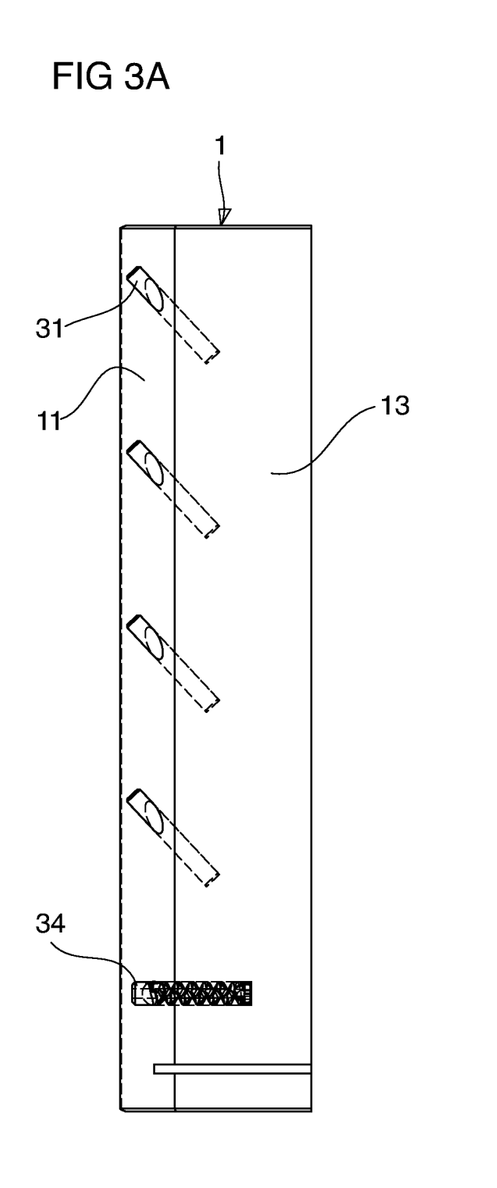
FIG. 3A show a part of the first panel in top view according to an embodiment of the invention.

FIG. 3A disclose a part of the first panel 1 according an embodiment of the invention. The mechanical locking device may comprise at least two rod-shaped elements 31.

According an embodiment of the invention the mechanical locking device may comprise two or more rod-shaped elements 31, arranged in a row mainly parallel to the first or second edge surface.

To improve the strength of the mechanical locking device the row of rod-shaped elements 31 may be positioned closer to the inner corner, than the outer corner of a set, that is, the row may be positioned between a center line of the first panel 1 intersection of the first panel surface 13 and the junction plane J.

The rod-shaped element 31 may be arranged in a rod element groove 36 in the first edge surface 11.

The rod-shaped element 31 may be configured to be attached in the rod element groove 36 by friction.

According an embodiment of the invention the rod-shaped element 31 may be configured to be glued in the rod element groove 36.

According an embodiment of the invention the rod-shaped element 31, the rod element groove 36 and the insertion groove 32 may have a substantially circular shape, although other shapes, such as triangular, rectangular, square, etc. are possible.

According to an embodiment the rod-shaped element 31 is made from one or more of a wood based material, a polymer material, which may comprise reinforcement, such as glass fibre or a metal.

According to an embodiment the rod shaped element 31 may have a waxed surface to facilitate assembly.

Figure 3B:
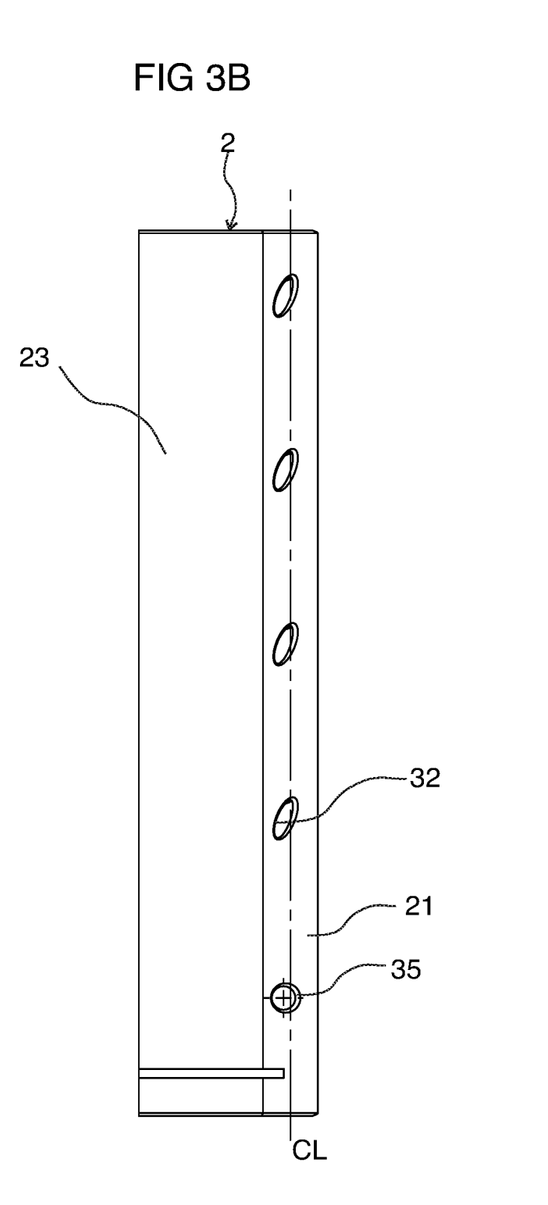
FIG. 3B show a part of the second panel in top view according to an embodiment of the invention.
Figure 4A:
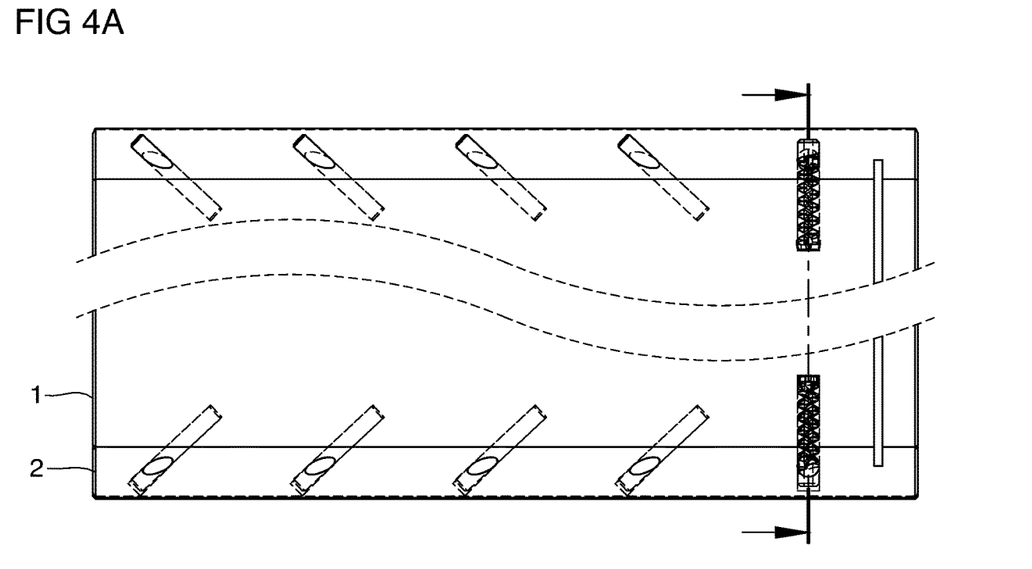
FIG. 4A show a side view of an embodiment comprising a set in a locked position.
Figure 4B:
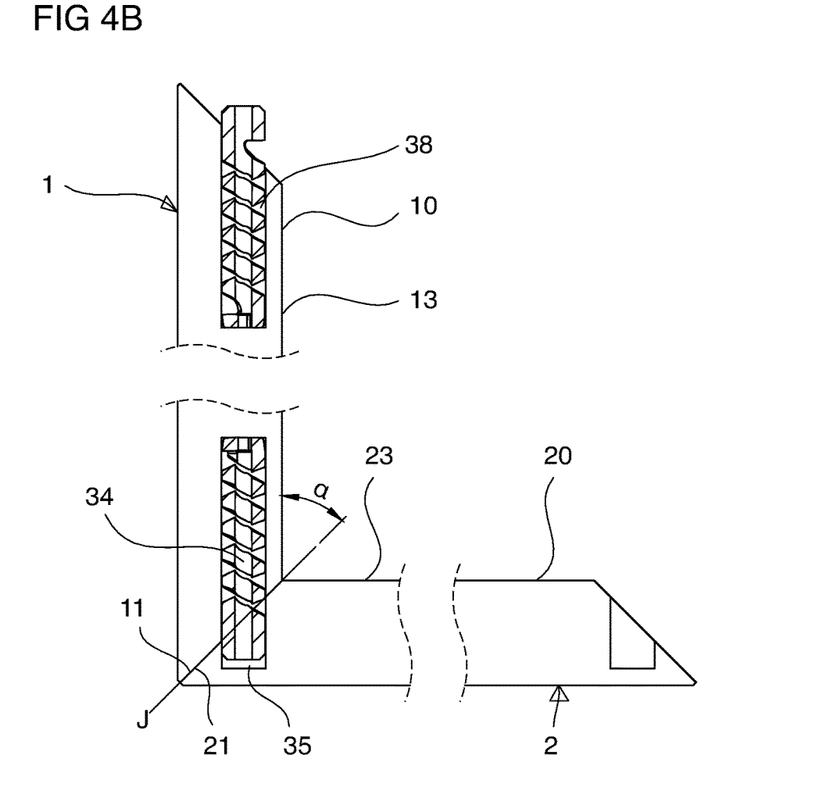
FIG. 4B show a cross sectional view of a set in a locked position according to an embodiment of the invention. The cross section intersects the locking groove, as illustrated in FIG. 4A.

FIG. 3B disclose a part of the second panel 2 according an embodiment of the invention. The insertion groove 32 and/or the rod element groove 36 may be a drill hole.

According an embodiment of the invention the drill hole is a bottom-ended drill hole.

The insertion groove 32 may comprise a chamfer 33 or a rounding at the groove opening, which is configured to guide the rod shaped element 31 during assembling.

Two or more insertion grooves 32 may be arranged in a row mainly parallel to the first or second edge surface 11,22.

To improve the strength of the mechanical locking device the row of insertion grooves 32 may be positioned closer to the inner corner, than the outer corner of a set, that is, the row may be positioned between a center line CL of the second edge surface 21 and the intersection of the second panel surface 23 and the junction plane J.

FIG. 4A-5B disclose a set in locked position according an embodiment of the invention. The first angle α between the junction plane J and the first main plane 10 may be about 45°. A different angle may be preferred for a set with different thicknesses of the first and the second panels 1,2. The angle may be adapted such that the junction plane extends through an intersection of an outer face of the first panel and an outer face of the second panel to an intersection of an inner face of the first panel and an inner face of the second panel. The inner face of the first panel may be facing the inner face of the second panel. An outer face of the first panel may be opposite to the inner face of the first panel. An outer face of the second panel may be opposite to the inner face of the second panel.

An outer corner at the junction plane J of the first 1 and the second 2 panel may comprise a beveled edge, preferably covered by a decorative layer. The bevel may increase the strength of the corner. The decorative layer may be a plastic foil, veneer or paint.

According to an embodiment of the invention the locking part 34 may be flexible.

The locking part 34 may in an unflexed/non-compressed state, be configured to be positioned partly in the locking groove 35.

The locking part 34 may comprise a spring.

The locking part 34 may be arranged in a locking part groove 38, on the first edge surface 11 or on the second edge surface 21.

Figure 5A:
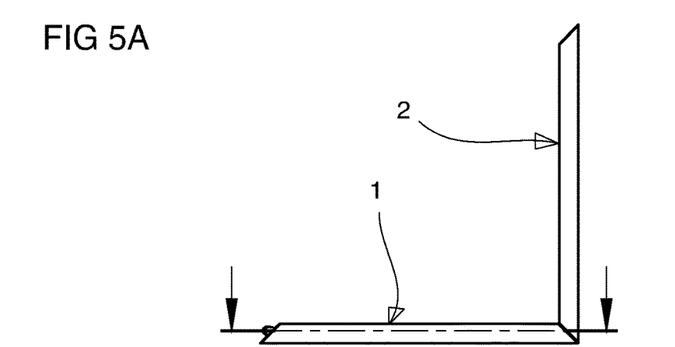
FIG. 5A show a side view of an embodiment comprising a set in a locked position.
Figure 5B:
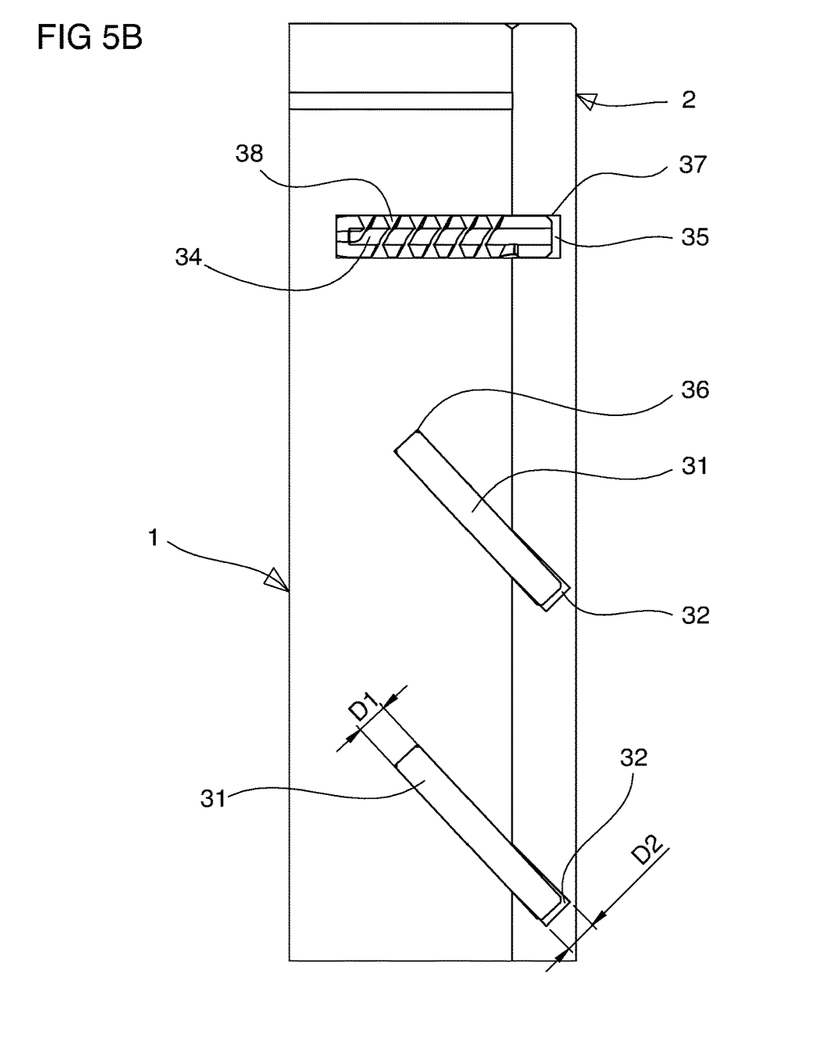
FIG. 5B show a part of a cross section of a set in a locked position according to an embodiment of the invention. The cross section intersects the locking groove and the insertion groove.

The rod-shaped element 31 may have a diameter D1. The diameter D2 of the insertion groove 32 may be larger than the diameter D1 of the rod-shaped element 31. The diameter D2 of the insertion groove 32 may be about 0.3 to about 0.8 mm larger than the diameter D1 of the rod-shaped element 31 for optimal assembly.

Figure 6:
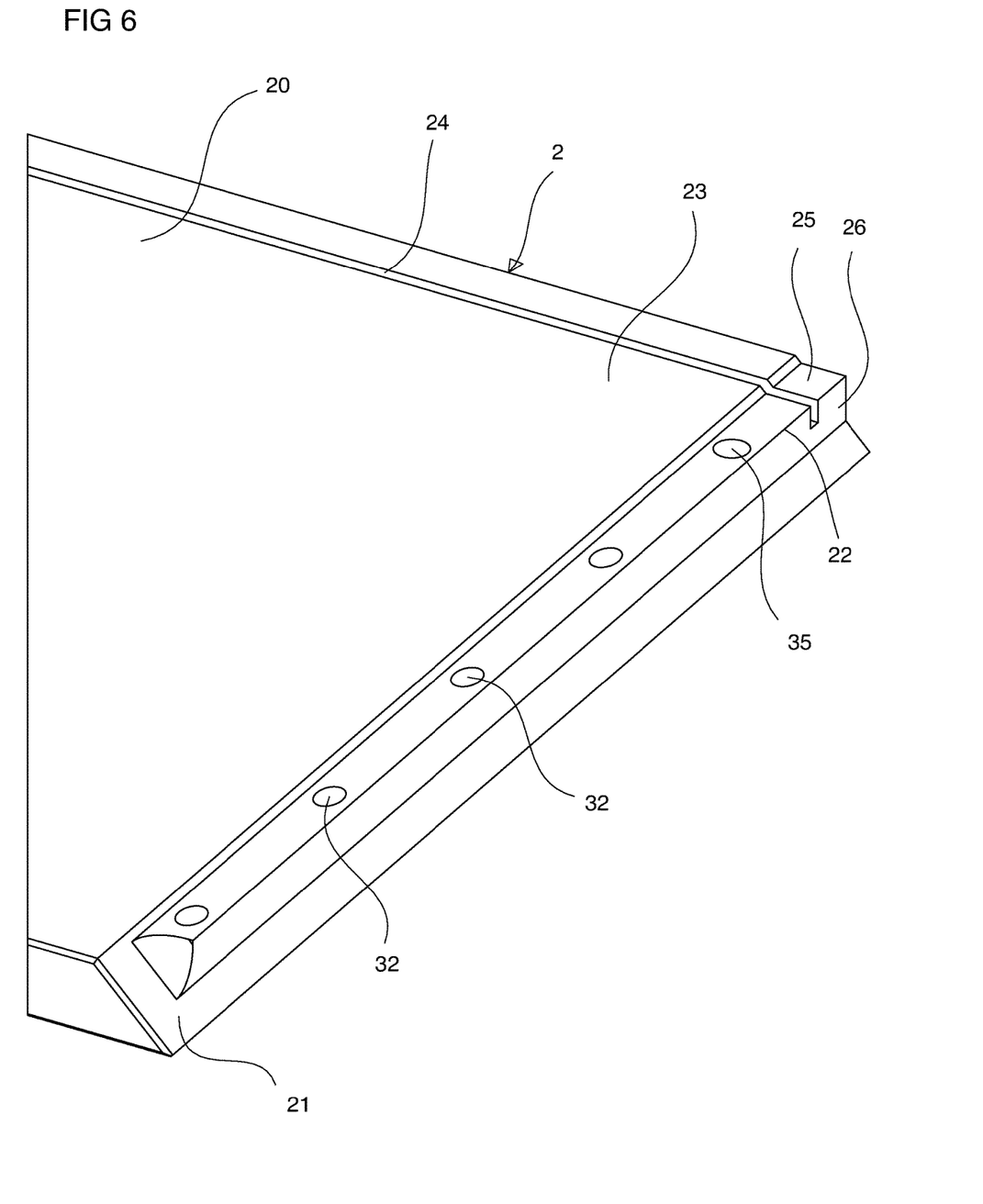
FIG. 6 show a 3D-view of a part of the second panel comprising a tongue according to an embodiment of the invention.
Figure 7:
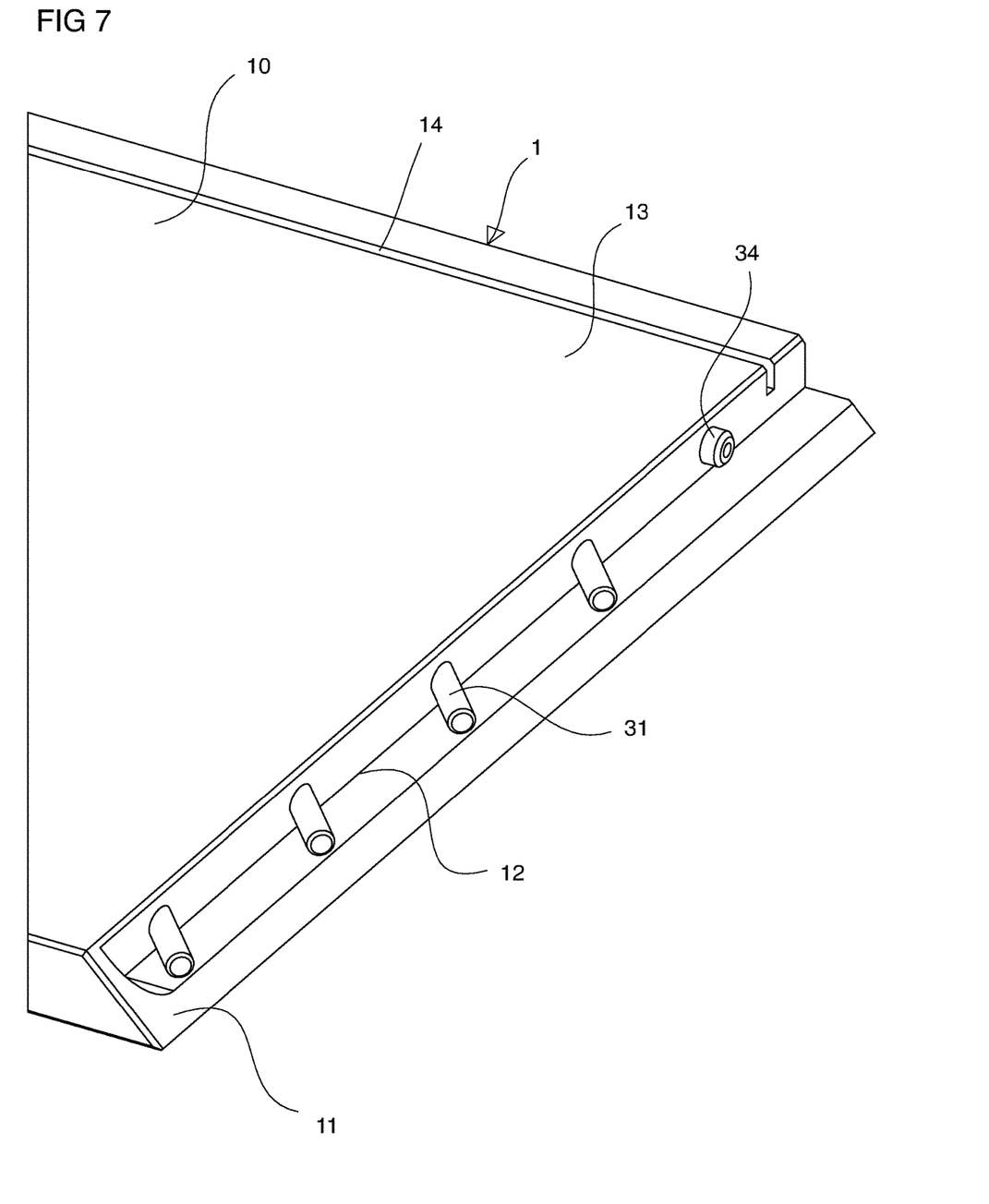
FIG. 7 show a 3D-view of a part of the first panel comprising a tongue groove according to an embodiment of the invention.

FIG. 6 disclose a first panel and FIG. 7 disclose a second panel according an embodiment of the invention. The first or second edge surface 11,21 may comprise a tongue 22, wherein said tongue may comprise a first tongue surface 25 and a second tongue surface 26 and the other of said opposite first or second edge surface 11,21 comprise a tongue groove 12.

The tongue 22 and/or the tongue groove 12 may extend along essentially the whole panel edge.

Figure 8A:
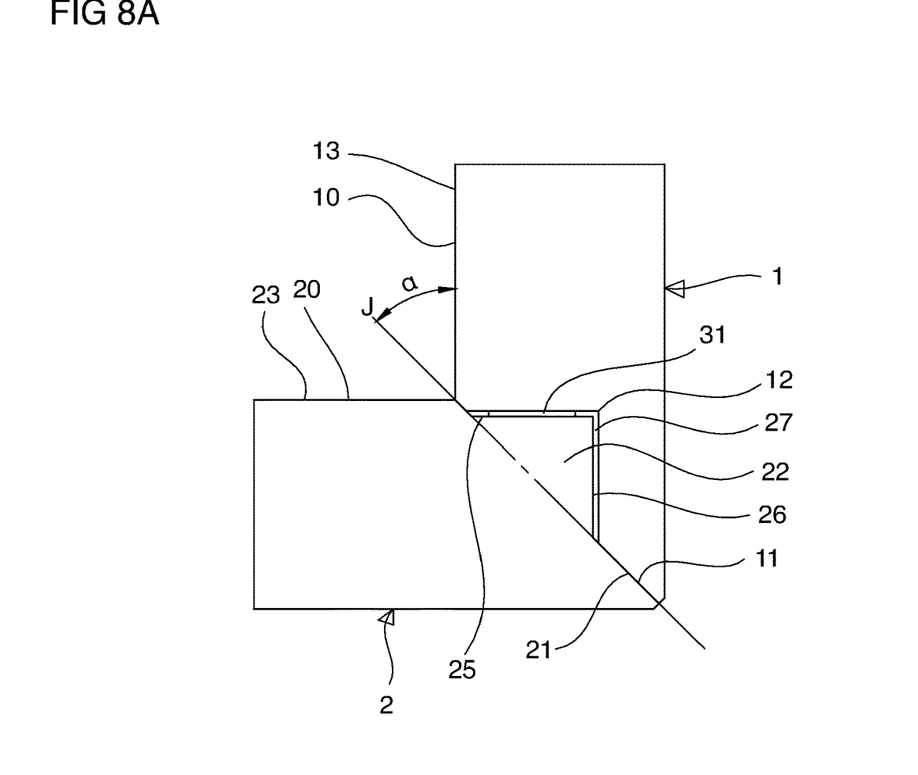
FIG. 8A show a side view of an embodiment comprising a set in a locked position. The mechanical locking device comprise a space between the tongue and the tongue groove.

FIG. 8A disclose a side view of a set according an embodiment of the invention. The set may be an embodiment of the set of panels shown in FIGS. 6,7. The mechanical locking device may comprise a first space 27 between the tongue groove 12 and the first tongue surface 25 and/or the second tongue surface 26 in locked position.

The first space 27 may have the effect that a gap is avoided at the inner and outer corner of the junction plane J between the first and second edge surface 11,22 since a greater contact pressure may be obtained at the inner and outer corner.

The first or the second panel 1,2 comprising the tongue groove 12 may be combined with a first or a second panel 1,2 without a tongue 22, forming a joint comprising a space between the first or second edge surface 11,22 and the tongue groove 12.

The first panel 1 comprising the tongue groove 12 may form a set with a second panel 2 comprising a tongue groove 12' forming a joint comprising a space between the tongue groove 12 and the tongue groove 12'.

According an embodiment of the invention the tongue groove 12 may comprise one or more rod-shaped elements 31.

The tongue 22 may comprise one or more insertion groove 32. Positioning of the insertion groove 32 at least partly in the tongue 22 may increase the engagement area of the rod-shaped element 31 and the insertion groove 32. The advantage may be a greater stability of the joint.

Figure 8B:
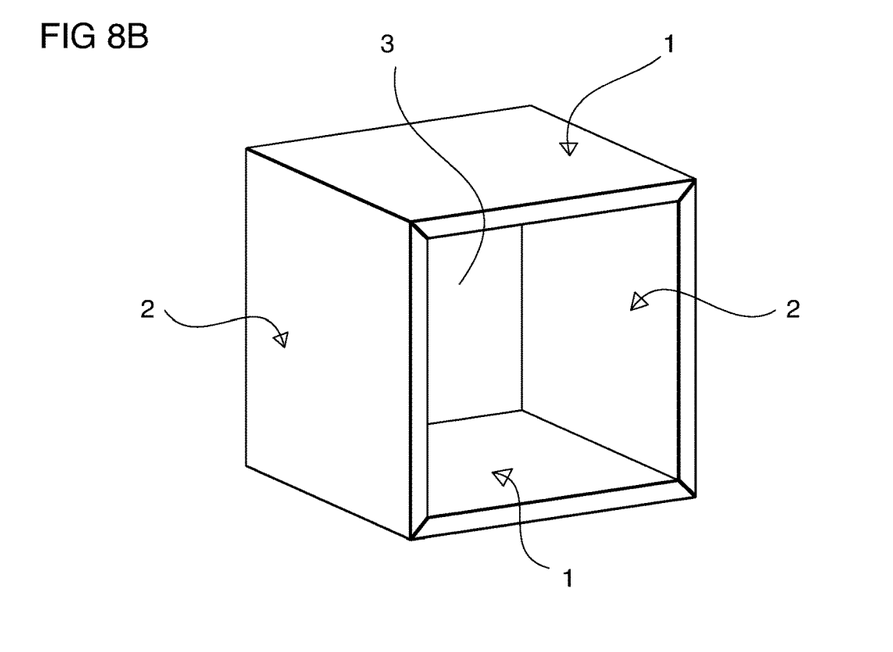
FIG. 8B shows an 3D-view of a set comprising two of the first panel, two of the second panel forming a cabinet frame and one back panel in an assembled state of an embodiment of the invention.

FIG. 8B disclose a furniture product comprising two of the first panel 1, two of the second panel 2 and a back panel 3. The back panel 3 may be configured to be inserted in, and optionally cooperate with, the first and second panel grooves 14,24.

The furniture product may be a bookshelf, a cupboard, a wardrobe, a box or a drawer.

According an embodiment of the invention the first panel 1 may comprise one first edge surface 11 and one second edge surface 22.

According an embodiment of the invention the first and the second panel 1,2 may be mainly identical. In this embodiment the first panel comprises the first edge surface 11 and the second edge surface 21 on opposite sides of the first panel. Above described embodiment enables to form a furniture frame with 4 mainly identical panels.

The sidewalls of the insertion groove 32 and the locking groove 35 may comprise material of the core of the first panel 1 or the second panel 2, dependent on in which panel they are made.

According an embodiment of the invention the insertion groove 32 and/or the rod element groove 36 may be reinforced with plastic, e.g., thermoplastic, and/or liquid, e.g., PVAc-glue.

The insertion groove 32 and/or the rod element groove 36 may be reinforced with metal, such as zinc or zinc alloy.

The core of the first panel 1 and/or of the second panel 2 and/or the back panel 3 may be a wood-based core, such as MDF, HDF, OSB, WPC, plywood or particleboard. The core may also be a plastic core comprising thermosetting plastic or thermoplastic, e.g., vinyl, PVC, PU or PET. The plastic core may comprise fillers.

The first panel 1 and/or the second panel 2 and/or the back panel 3 may be of solid wood.

The first panel 1 and/or the second panel 2 and/or the back panel 3 may be provided with a decorative layer, such as a foil or a veneer, on one or more surfaces.

According to an aspect the set of panels may be resilient panels. The resilient panels may comprise a core comprising thermoplastic material. The thermoplastic material may be foamed.

The thermoplastic material may comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The core may be formed of several layers.

The aspects described above may comprise a decorative layer, such as a decorative foil comprising a thermoplastic material. The thermoplastic material of the decorative layer may be or comprise polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof. The decorative foil may be printed, for example by direct printing, rotogravure, or digital printing. According to an aspect the decorative layer comprises melamine, a high pressure laminate (HPL) or a veneer.

The aspects described above may comprise a wear layer such as a film or foil. The wear layer may comprise thermoplastic material. The thermoplastic material may be polyvinyl chloride (PVC), polyester, polypropylene (PP), polyethylene (PE), polystyrene (PS), polyurethane (PU), polyethylene terephthalate (PET), polyacrylate, methacrylate, polycarbonate, polyvinyl butyral, polybutylene terephthalate, or a combination thereof.

The aspects described above may comprise a wood base core, such as HDF, MDF, plywood, particleboard, OSB or Masonite.

The different aspects, embodiments and alternatives described above may be combined with one or more of the other described aspects, embodiments and alternatives.

Further embodiments of the invention are described below.

1. A set comprising a first panel 1 with a first main plane 10 and a first panel surface 13, and a second panel 2 with a second main plane 20 and a second panel surface 23, and a mechanical locking device for locking of a first edge surface 11 of the first panel 1 to a second edge surface 21 of the second panel 2 at a junction plane J wherein the first main plain 10 is essentially perpendicular to the second main plane 20 and the junction plane J is extending at a first angle α to the first main plane 10, the mechanical locking device comprises at least one rod-shaped element 31 at the first edge surface 11 and at least one insertion groove 32 at the second edge surface 21, the rod-shaped element 31 is configured to be inserted into the insertion groove 32, the rod-shaped element 31 extends at a second angle β from the first edge surface 11, the insertion groove 32 extends into the second edge surface 21 at a third angle γ from the second edge surface 21, the mechanical locking device further comprises at least one locking groove 35 at the first edge surface 11 or at the second edge surface 21 and at least one locking part 34 at the other of said first or second edge surface, wherein the locking groove 35 comprises at least one locking surface 37 extending at a fourth angle δ from the first edge surface 11 or from the second edge surface 21, the locking part 34 is configured to be inserted into the locking groove 35 and lock against the locking surface 37, and the second angle β is different than the fourth angle δ, and the first angle α between the junction plane J and the first main plane 10 is optionally about 45°.

2. The set as described in embodiment 1, wherein the mechanical locking device is configured to obtain the locked position by displacing the first panel 1 relative the second panel 2 in an assembly direction AD, which is essentially parallel with the first panel surface 13 and essentially parallel to a length direction L and/or axial direction CA of the rod-shaped element 31.

3. The set as described in embodiment 1 or 2, wherein the fourth angle δ is about 45° to about 90° larger than the second angle β.

4. The set as described in any one of the previous embodiments, wherein the second angle β is within the range of about 30° to 60°, or within the range of 40° to 50°, or about 45°.

5. The set as described in any one of the previous embodiments, wherein the mechanical locking device comprises at least two rod-shaped elements 31.

6. The set as described in any one of the previous embodiments, wherein the mechanical locking device comprises two or more rod-shaped elements 31, arranged in a row mainly parallel to the first or second edge surface.

7. The set as described in any one of the previous embodiments, wherein the rod-shaped element 31 is arranged in a rod element groove 36 in the first edge surface 11.

8. The set as described in any one of the previous embodiments, wherein the insertion groove 32 and/or the rod element groove 36 is a drill hole.

9. The set as described in embodiment 8, wherein the drill hole is a bottom-ended drill hole.

10. The set as described in any one of the previous embodiments, wherein the locking part 34 is flexible.

11. The set as described in any one of the previous embodiments, wherein the locking part 34 in an unflexed/non-compressed state, is configured to be positioned partly in the locking groove 35.

12. The set as described in any one of the previous embodiments, wherein the locking part 34 comprises a spring.

13. The set as described in any one of the previous embodiments, wherein the locking part 34 is arranged in a locking part groove 38, on the first edge surface 11 or on the second edge surface 21.

14. The set as described in any one of the previous embodiments, wherein the first or second edge surface 11,21 comprises a tongue 22, wherein said tongue comprises a first tongue surface 25 and a second tongue surface 26 and the other of said opposite first or second edge surface 11,21 comprises a tongue groove 12.

15. The set as described in embodiment 14, wherein the mechanical locking device comprises a first space 27 between the tongue groove 12 and the first tongue surface 25 and/or the second tongue surface 26 in locked position.

16. The set as described in embodiment 14 or 15, wherein the tongue groove 12 comprises one or more rod-shaped elements 31.

17. The set as described in any one of the previous embodiments, wherein the first panel 1 comprises a first panel groove 14 on the first panel surface 13 and the second panel 2 comprises a second panel groove 24 on the second panel surface 23.

18. The set as described in embodiment 17, wherein the set further comprises a back panel 3 configured to be inserted in, and optionally to cooperate with, the first and second panel groove 14,24.

19. The set as described in any one of the previous embodiments, wherein the insertion groove 32 and/or the rod element groove 36 is reinforced with plastic, e.g., thermoplastic, and/or liquid, e.g., PVAc-glue.

The invention claimed is:

1. A set comprising a first panel with a first main plane, a first edge surface and a first panel surface, and a second panel with a second main plane, a second edge surface and a second panel surface, and a mechanical locking device with a junction plane (J), wherein the mechanical locking device is configured for locking the first edge surface of the first panel to the second edge surface of the second panel at the junction plane (J), wherein the first main plane is essentially perpendicular to the second main plane and the junction plane (J) is extending at a first angle (α) to the first main plane, wherein the mechanical locking device comprises at least two rod-shaped elements at the first edge surface and at least two insertion grooves at the second edge surface, wherein the at least two rod-shaped elements are configured to be inserted into the insertion grooves in a locked position of the first and second panels, wherein the at least two rod-shaped elements extend at a second angle (β) from the first edge surface, wherein the insertion grooves extend into the second edge surface at a third angle (γ) from the second edge surface, wherein the mechanical locking device further comprises at least one locking groove at the first edge surface or at the second edge surface and at least one locking part arranged in a locking part groove at the other of said first or second edge surface, wherein the locking part is resiliently retractable into the locking part groove and is biased to outwardly extend from the locking part groove, wherein the locking groove comprises at least one locking surface extending at a fourth angle (δ) from the first edge surface or from the second edge surface, the locking part is configured to be inserted into the locking groove and lock against the locking surface in the locked position, and the second angle (β) is different than the fourth angle (δ), wherein the first angle (α) between the junction plane (J) and the first main plane is about 45°, wherein the second angle (β) is within the range of about 30° to 60°, and wherein the mechanical locking device is configured to obtain the locked position by displacing the first panel relative the second panel in an assembly direction (AD), which is essentially parallel with the first panel surface and essentially parallel to a length direction (L) and/or axial direction (CA) of the at least two rod-shaped elements, wherein an end surface of the locking part is slid along the first or second edge surface while sliding the rod-shaped elements into the insertion grooves such that the locking part is resiliently retracted into the locking part groove until the locking part springs into the locking groove in the locked position.

2. The set as claimed in claim 1, wherein the fourth angle (δ) is about 45° to about 90° larger than the second angle (β).

3. The set as claimed in claim 1, wherein the at least two rod-shaped elements are arranged in a row mainly parallel to the first or second edge surface.

4. The set as claimed in claim 1, wherein the at least two rod-shaped elements are arranged in corresponding rod element grooves in the first edge surface.

5. The set as claimed in claim 4, wherein the insertion grooves and/or the rod element grooves are drill holes.

6. The set as claimed in claim 5, wherein the drill hole is a bottom-ended drill hole.

7. The set as claimed in claim 1, wherein the locking part is flexible.

8. The set as claimed in claim 7, wherein the locking part in an unflexed/non-compressed state, is configured to be positioned partly in the locking groove.

9. The set as claimed in claim 1, wherein the locking part comprises a spring.

10. The set as described in claim 1, wherein the first panel comprises a first panel groove on the first panel surface and the second panel comprises a second panel groove on the second panel surface, wherein the set further comprises a back panel configured to be inserted in the first and second panel groove.

11. The set as described in claim 1, wherein the at least two rod-shaped elements are parallel to one another.

12. The set as described in claim 1, wherein, in the locked position, the at least two rod-shaped elements are arranged in a row along a first direction that is parallel to the first and second main planes.

13. The set as described in claim 12, wherein, in the locked position, the at least two rod-shaped elements are angled at the second angle (β) relative to the first direction.

14. A set comprising a first panel with a first main plane, a first edge surface and a first panel surface, and a second panel with a second main plane, a second edge surface and a second panel surface, and a mechanical locking device with a junction plane (J), wherein the mechanical locking device is configured for locking the first edge surface of the first panel to the second edge surface of the second panel at the junction plane (J), wherein the first main plane is essentially perpendicular to the second main plane and the junction plane (J) is extending at a first angle (α) to the first main plane, wherein the mechanical locking device comprises at least one rod-shaped element at the first edge surface and at least one insertion groove at the second edge surface, wherein the rod-shaped element is configured to be inserted into the insertion groove in a locked position of the first and second panels, wherein the rod-shaped element extends at a second angle (β) from the first edge surface, wherein the insertion groove extends into the second edge surface at a third angle (γ) from the second edge surface, wherein the mechanical locking device further comprises at least one locking groove at the first edge surface or at the second edge surface and at least one locking part arranged in a locking part groove at the other of said first or second edge surface, wherein the locking part is resiliently retractable into the locking part groove and is biased to outwardly extend from the locking part groove, wherein the locking groove comprises at least one locking surface extending at a fourth angle (δ) from the first edge surface or from the second edge surface, the locking part is configured to be inserted into the locking groove and lock against the locking surface in the locked position, and the second angle (β) is different than the fourth angle (δ), wherein the first angle (α) between the junction plane (J) and the first main plane is about 45°, wherein the second angle (β) is within the range of about 30° to 60°, and wherein the mechanical locking device is configured to obtain the locked position by displacing the first panel relative the second panel in an assembly direction (AD), which is essentially parallel with the first panel surface and essentially parallel to a length direction (L) and/or axial direction (CA) of the rod-shaped element, wherein the second edge surface comprises a tongue, wherein said tongue comprises a first tongue surface and a second tongue surface and the first edge surface comprises a tongue groove configured to cooperate with the tongue in the locked position, wherein the tongue comprises the at least one insertion groove and the at least one locking groove, and wherein the tongue groove comprises the at least one rod-shaped element and the at least one locking part.

15. The set as claimed in claim 14, wherein the mechanical locking device comprises a first space between the tongue groove and the first tongue surface and/or the second tongue surface in the locked position.

* * * * *